US008054766B2

(12) United States Patent
Bou-Diab et al.

(10) Patent No.: US 8,054,766 B2
(45) Date of Patent: Nov. 8, 2011

(54) METHOD AND TOOL FOR IP MULTICAST NETWORK ADDRESS TRANSLATION (MNAT)

(75) Inventors: Bashar Said Bou-Diab, Ottawa (CA); Olivier Le Moigne, Ottawa (CA); John Coulter, Richmond (CA)

(73) Assignee: Alcatel Lucent, Paris (FR)

( * ) Notice: Subject to any disclaimer, the term of this patent is extended or adjusted under 35 U.S.C. 154(b) by 280 days.

(21) Appl. No.: 12/004,924

(22) Filed: Dec. 21, 2007

(65) Prior Publication Data
US 2009/0161674 A1    Jun. 25, 2009

(51) Int. Cl.
*H04L 12/16* (2006.01)
*H04L 12/56* (2006.01)
(52) U.S. Cl. .................... 370/270; 370/392; 370/401
(58) Field of Classification Search .................. None
See application file for complete search history.

(56) References Cited

U.S. PATENT DOCUMENTS

| | | | | |
|---|---|---|---|---|
| 6,856,621 | B1 * | 2/2005 | Artes | 370/390 |
| 7,418,003 | B1 * | 8/2008 | Alvarez et al. | 370/432 |
| 2004/0022244 | A1 * | 2/2004 | Boers et al. | 370/390 |
| 2004/0100983 | A1 * | 5/2004 | Suzuki | 370/390 |
| 2004/0205215 | A1 * | 10/2004 | Kouvelas et al. | 370/351 |
| 2005/0180448 | A1 * | 8/2005 | Kobayashi | 370/432 |
| 2005/0190765 | A1 * | 9/2005 | Gotoh et al. | 370/390 |
| 2006/0159092 | A1 * | 7/2006 | Boers et al. | 370/390 |
| 2006/0268869 | A1 * | 11/2006 | Boers et al. | 370/390 |
| 2007/0121664 | A1 * | 5/2007 | Szczebak et al. | 370/449 |
| 2007/0127473 | A1 * | 6/2007 | Kessler et al. | 370/390 |

* cited by examiner

*Primary Examiner* — Chirag Shah
*Assistant Examiner* — Joshua Smith
(74) *Attorney, Agent, or Firm* — Galasso & Associates, LP

(57) ABSTRACT

The present invention permits translation of SM addresses (*, $G_1$) and (*, $G_2$) to configurable SSM addresses ($S_0$, $G_0$). IGMPv2 group membership queries from the receiver subnet are translated to IGMPv3 membership queries for processing in a SSM network. In the preferred embodiment, packets travel via a connection to the multicast router (mrouter). The mrouter queries an IGMPv2 receiver. The IGMPv2 receiver generates a membership report and sends it back to the mrouter. The mrouter translates the membership report into a ($S_0$, $G_0$) as specified in a multicast address translation table and stores the translation in the Multicast Forward Information Base (MFIB) located in the mrouter. Multicast payload addressed ($S_0$, $G_0$) flowing towards the IGMPv2 receiver can be translated to ($S_0$, $G_0$). When media data is addressed to ($S_0$, $G_0$), the mrouter consults the MFIB for forwarding and can also translate the destination address to ($S_1$, $G_1$).

9 Claims, 3 Drawing Sheets

METHOD AND TOOL FOR IP MULTICAST NETWORK ADDRESS TRANSLATION (MNAT)

CROSS REFERENCE TO RELATED APPLICATIONS

This United States non-provisional patent application does not claim priority to any United States provisional patent application or any foreign patent application.

FIELD OF THE DISCLOSURE

The disclosures made herein relate generally to the IP multicast networking industry. The invention is applicable to source specific multicast and network address translation technologies. The invention is particularly useful in networks providing IP video and audio services.

BACKGROUND

The internet is a collection of networks that are interconnected logically as a single, large, virtual network. Messages between computers are exchanged by using packet switching. Networks can communicate with one another because they all use a protocol. Protocols are formal descriptions of messages to be exchanged and of rules to be followed in order for two or more systems to exchange information in a manner that all parties will understand.

Internet Protocol (IP) specifies the format of IP packet headers as they travel through the network, performs routing functions and selects the transmission path on which data will be sent. Routers utilize ports and addresses in routing tables to send data packets or cells through the network from node to node. IP handles packet forwarding and transporting of datagrams across a network.

With packet forwarding, computers can send a packet on to the next appropriate network component, based on the address in the packet's header. IP defines the basic unit of data transfer, the datagram or the packet, and it also defines the format of IP packet headers as they travel across the internet.

Every computer on the internet has a unique address. The entire datagram or packet has four entities—the payload field, the next protocol field, the IP field and the layer 2 field. Datagram or packet refers to the combination of the payload, the next protocol field and the IP address.

IP specifies the requirements to route, store and forward data among hosts on the network. IP functions at Layer 3, the network layer, and it provides several services, including host addressing, error notification, fragmentation and reassembly, routing, and packet timeout. The Layer 4 protocol, usually TCP or UDP, presents the data to IP in order to provide basic host-to-host communication. IP then attaches to the packet, in a protocol header, the address from which the data comes and the address of the system to which it is going.

Internet Group Management Protocol (IGMP) is a Layer 3, network layer, protocol whose primary purpose is to allow internet hosts to participate in multicasting. The IGMP standard describes the basics of multicasting IP traffic, including the format of multicast IP addresses, multicast Ethernet encapsulation, and the concept of a host group (a set of hosts interested in traffic for a particular multicast address). IGMP enables a router to determine which host groups have members on a given network segment, but IGMP does not address the exchange of multicast packets between routers.

IGMPv1 was the first widely-deployed version of IGMP. IGMPv2 is an upgrade from the first version of IGMP. IGMPv2 allows group membership termination to be quickly reported to the routing protocol. IGMPv3 is a further upgrade from IGMPv2. IGMPv3 has the ability for a system to report interest in receiving packets only from specific source addresses, or from all but specific source addresses, sent to a particular multicast address. That information may be used by multicast routing protocols to avoid delivering multicast packets from specific sources to networks where there are no interested receivers.

IGMPv3 hosts and routers interoperate with hosts and routers that have not yet been upgraded to IGMPv3. This compatibility is maintained by hosts and routers taking appropriate actions depending on the versions of IGMP operating on hosts and routers within a network. If any older versions of IGMP are present on a Local Area Network (LAN) segment (router interface), the IGMP querier on the router must use the lowest version of IGMP present on the LAN segment.

Multicasting involves sending information from one transmitter to multiple receivers. With multicast, an individual only needs one IP connection to do a videoconferencing session between one city and another city having, for example, four remote offices rather than needing four separate IP connections. A multicast router located in the first city enfolds IP packets in special multicast packets and forwards those packets to a multicast router in the second city which removes the IP packets, replicates them, and then distributes them to the four locations in the second city. In IP networks, the IP multicast protocol involves the use of a special group of addresses known as multicast addresses. Each destination address identifies a group of receivers to which all information is replicated.

The current generation of IP is called IP version 4 (IPv4). IPv4 addresses have two parts: the network ID and the host ID. Under IPv4, there are five classes that support different numbers of networks and hosts. The fourth class belongs to the multicast backbone.

The multicast backbone conserves bandwidth over a distance, relieves congestion on transit links, and makes it possible to address a large population in a single multicast. The first octet of the multicast addresses starts at 224 and runs through 239.

The present invention is directed to the problem of limited IP multicast addresses. IPv4 provides limited addressing space for multicast (224.0.0.0<G<239.255.255.255) for a total of 268 million multicast group addresses.

Source Specific Multicast (SSM) removes the limited address space restriction by allowing each source with IP address (S) to use the entire SSM space, such that each combination of (S, G) represents a different multicast group. However, the problem of limited address space persists in the majority of cases where IGMPv2 is used with SSM and SSM translation from $(*, G_0)$ to $(S_0, G_0)$.

There is no prior art directly targeted towards solving the same problem. SSM translations allow the use of IGMPv2 receivers with a SSM IP network by having the receiver IGMP querier translate $(*, G_0)$, IGMPv2 queries, into $(S_0, G_0)$, IGMPv3 queries, before processing. However, the group address is never translated with SSM translations.

If two channels $(*, G_1)$ and $(*, G_2)$ are joined by an IGMPv2 receiver, the SSM translations at the querier translates these groups into two SSM groups with $(S_1, G_1)$ and $(S_2, G_2)$. There is no flexibility in translating the group address of the (S, G) multicast channel. The rapid rollout of IPTV service by network operators is accelerating the exhaustion of IP multicast address space, in the majority of cases where IGMPv2 receivers are used.

Hence, there is a need in the art for a convenient to implement, reliable, inexpensive and efficient method and device for translating SM addresses (*, $G_1$) and (*, $G_2$) to configurable SSM addresses ($S_0$, $G_0$).

SUMMARY OF THE DISCLOSURE

The invention is applicable to the field of IP multicast networking. The introduction of video over IP service by numerous service providers has accelerated the deployment of IP multicast technology and the usage of the IP multicast address space. Source Specific Multicast (SSM) solves the problem of bounded IP multicast address space by allowing each source ($S_1$) to reuse the SSM multicast address space.

However, the wide scale deployment of IGMPv2 by network operators dictates that a unique multicast group address (G) is required for each multimedia channel, even when Source Specific Multicast (SSM) is used beyond the receivers' subnets. IP Multicast Network Address Translation (MNAT) allows the re-use of SSM addresses by multiple sources even when IGMPv2 is used to join multicast channels from a SSM network.

The preferred embodiment of the invention utilizes a method for translating SM addresses (*, $G_1$) and (*, $G_2$) to configurable SSM addresses ($S_0$, $G_0$).

The principal object of this invention is to provide a method and device for translating SM addresses (*, $G_1$) and (*, $G_2$) to configurable SSM addresses ($S_0$, $G_0$).

Another object of this invention is to provide a new MNAT technique for conserving IP multicast addresses in the SSM network.

Another object of this invention is to provide a method for translating SM addresses (*, $G_1$) and (*, $G_2$) to configurable SSM addresses ($S_0$, $G_0$) that is relatively inexpensive to implement and maintain.

Another object of this invention is to provide a reliable method for translating SM addresses (*, $G_1$) and (*, $G_2$) to configurable SSM addresses ($S_0$, $G_0$).

Another object of this invention is to provide a method for translating SM addresses (*, $G_1$) and (*, $G_2$) to configurable SSM addresses ($S_0$, $G_0$) that can be implemented on a variety of routers, including Cisco routers, Juniper routers and Huwei routers.

Another object of the invention is to remove IP multicast address space restrictions in networks where IGMPv2 is widely deployed.

Another object of the invention is to provide flexibility in managing multicast IP address space.

Yet another object of this invention is to provide a method for translating SM addresses (*, $G_1$) and (*, $G_2$) to configurable SSM addresses ($S_0$, $G_0$) that is efficient.

DETAILED DESCRIPTION OF THE DRAWINGS

The invention involves a method and device for translating SM addresses (*, $G_1$) and (*, $G_2$) to configurable SSM addresses ($S_0$, $G_0$). The multicast group address translation is done at the control level and the datapath level.

Figure 1:
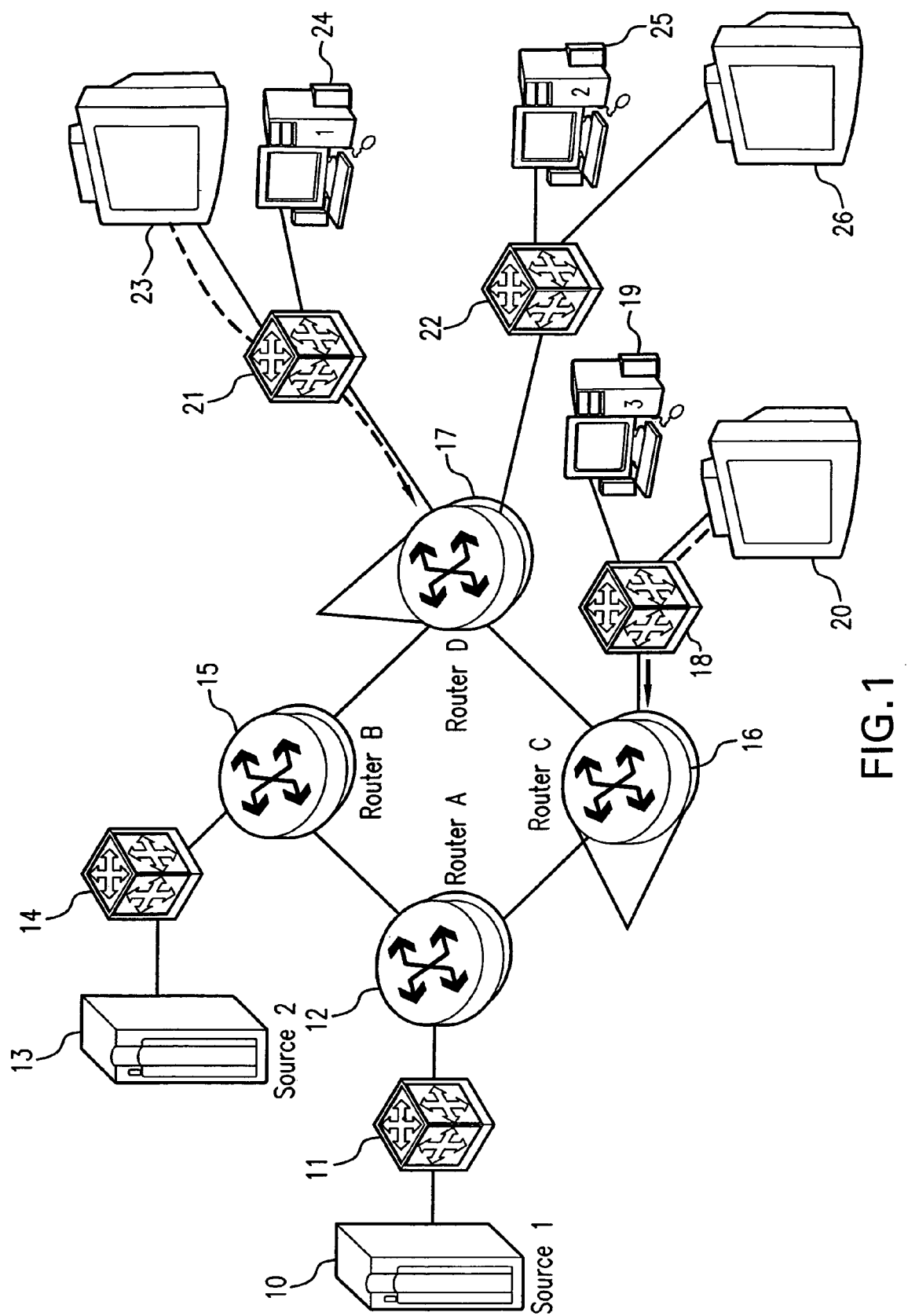
FIG. 1 depicts a flow diagram of the prior art translation of SM addresses (*, $G_1$) and (*, $G_2$) to SSM addresses ($S_1$, $G_1$) and ($S_2$, $G_2$).

FIG. 1 depicts a flow diagram of the prior art translation of SM addresses (*, $G_1$) and (*, $G_2$) to SSM addresses ($S_1$, $G_1$) and ($S_2$, $G_2$). SSM translations allow the use of IGMPv2 receivers with a SSM IP network by having the receiver IGMP querier translate (*, $G_0$), IGMPv2 queries, into ($S_0$, $G_0$), IGMPv3 queries, before processing. The group address is never translated with SSM translations in the prior art.

If two channels (*, $G_1$) and (*, $G_2$) are joined by an IGMPv2 receiver, the SSM translations at the querier translates these groups into two SSM groups with ($S_1$, $G_1$) and ($S_2$, $G_2$). There is no flexibility in translating the group address of the (S, G) multicast channel.

In FIG. 1, packets travel from source 1 ($S_1$) 10 to a first receiver 11 and on to a multicast router A 12. Similarly, packets travel from source 2 ($S_2$) 13 to a second receiver 14 and on to a multicast router B 15. These packets can then travel from multicast router A 12 to multicast router C 16 and from multicast router B 15 to a multicast router D 17.

The multicast router C 16 queries an IGMPv2 receiver 18, joining a SSM IP network through a connection. The IGMPv2 receiver 18 is connected to a computer 19 and a television 20 and generates a membership report and sends it back to the multicast router C 16 to allow the multicast router C 16 to keep track of the group memberships. In. FIG. 1, the IGMPv2 receiver 18 is joining a group, (*, $G_1$). The multicast router C 16 translates this into a SSM group with ($S_1$, $G_1$).

The multicast router D 17 also queries an IGMPv2 receiver 21 and an IGMPv2 receiver 22, joining a SSM IP network through connections. The IGMPv2 receiver 21 is connected to a computer 24 and a television 23, and the IGMPv2 receiver 22 is connected to a computer 25 and a television 26. The IGMPv2 receiver 21 and the IGMPv2 receiver 22 generate membership reports and send them back to the multicast router D 17 to allow the multicast router D 17 to keep track of the group memberships. In. FIG. 1, the IGMPv2 receiver 21 is joining a group, (*, $G_2$). The multicast router D 18 translates this into a SSM group with ($S_2$, $G_2$).

Figure 2:
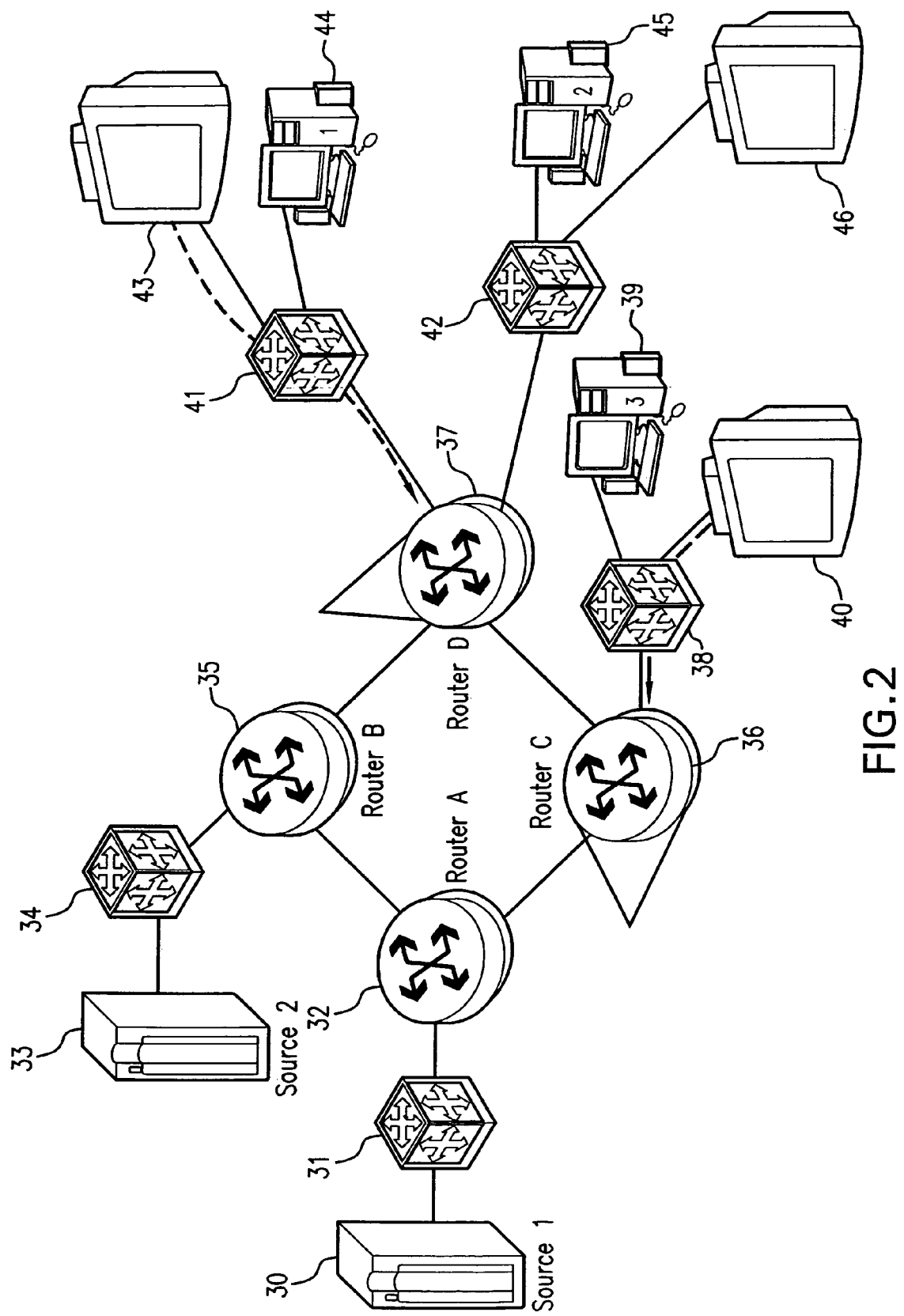
FIG. 2 depicts a flow diagram of the preferred embodiment of the invention permitting translation of SM addresses (*, $G_1$) to configurable SSM addresses ($S_0$, $G_0$).

FIG. 2 depicts a flow diagram of the preferred embodiment of the invention permitting translation of SM addresses (*, $G_1$) to configurable SSM addresses ($S_0$, $G_0$). IGMPv2 group membership queries from the receiver subnet are translated to IGMPv3 membership queries for processing in a SSM network. In FIG. 2, packets travel from source 1 ($S_1$) 30 to a first receiver 31 and on to a multicast router A 32. Similarly, packets travel from source 2 ($S_2$) 33 to a second receiver 34 and on to a multicast router B 35. These packets can then travel from multicast router A 32 to multicast router C 36 and from the multicast router B 35 to a multicast router D 37.

The multicast router C 36 queries an IGMPv2 receiver 38, joining a SSM IP network through a connection. The IGMPv2 receiver 38 is connected to a computer 39 and a television 40 and generates a membership report and sends it back to the multicast router C 36 to allow the multicast router C 36 to keep track of the group memberships.

The multicast router D 37 also queries an IGMPv2 receiver 41 and an IGMPv2 receiver 42, joining a SSM IP network through connections. The IGMPv2 receiver 41 is connected to a computer 44 and a television 43, and the IGMPv2 receiver 42 is connected to a computer 45 and a television 46. The IGMPv2 receiver 41 and the IGMPv2 receiver 42 generate membership reports and send them back to the multicast router D 37 to allow the multicast router D 37 to keep track of the group memberships.

In FIG. 2, the IGMPv2 receiver 38 is joining a group (*, $G_1$). The multicast router C 36 utilizes a multicast address translation table to translate this into a SSM group with ($S_0$, $G_0$) and stores this translation in a multicast forwarding information base in the multicast router C 36. The IGMPv2 receiver 41 is joining a group (*, $G_1$). The multicast router D 37 utilizes a multicast address translation table to translate this into a SSM group with ($S_0$, $G_0$) and stores this translation in a multicast forwarding information base in the multicast router D 37.

When multicast payload is addressed to ($S_0$, $G_0$), the multicast router D 37 consults the multicast forwarding information base in the multicast router D 37 and translates this into ($S_0$, $G_1$). Similarly when multicast payload is addressed to ($S_0$, $G_0$), the multicast router C 36 consults its multicast forwarding information base and translates this into ($S_0$, $G_1$).

Figure 3:
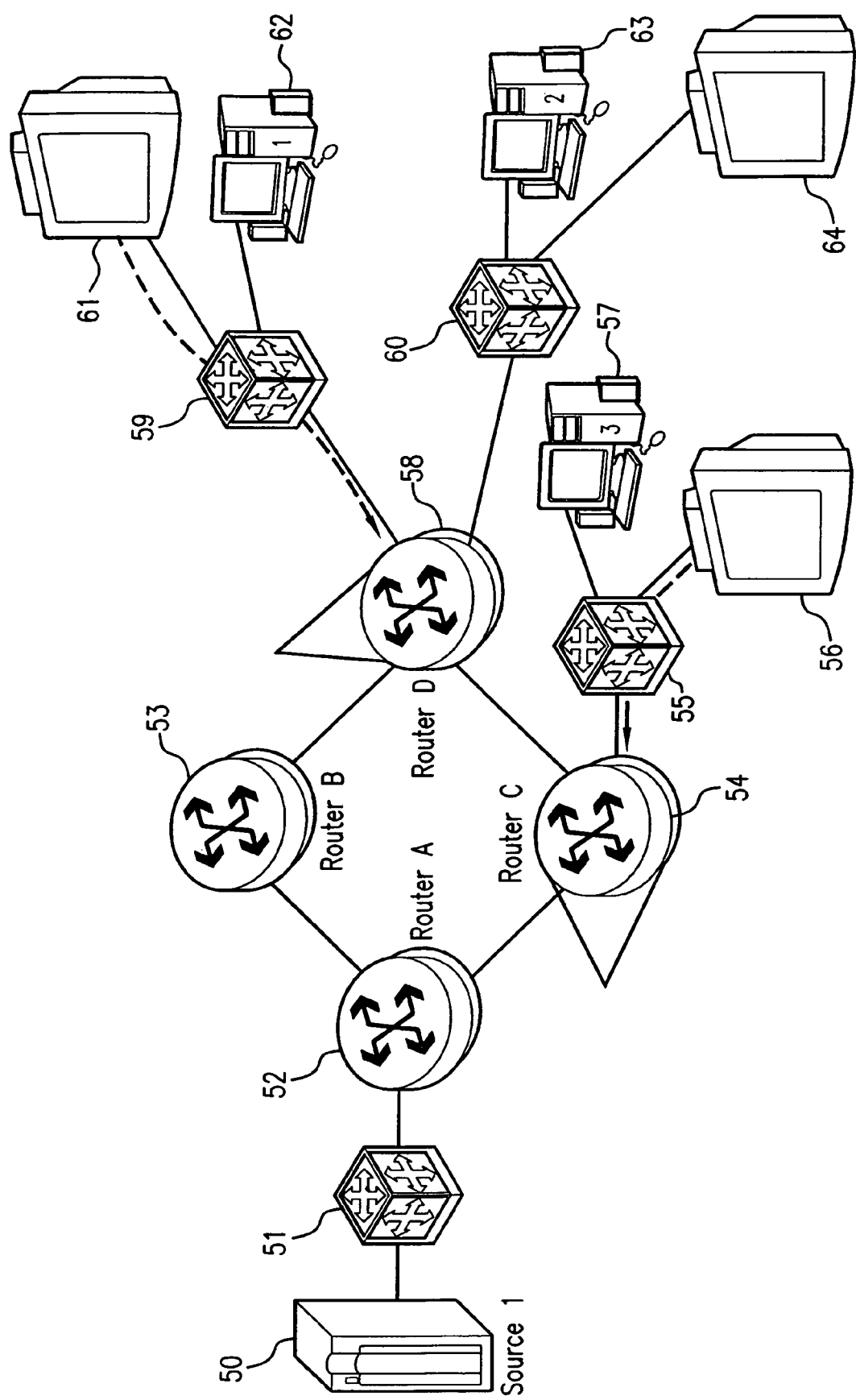
FIG. 3 depicts a flow diagram of an alternative embodiment of the invention permitting translation of SM address (*, $G_1$) and (*, $G_2$) to configurable SSM addresses ($S_0$, $G_0$).

FIG. 3 depicts a flow diagram of an alternative embodiment of the invention permitting translation of SM address (*, $G_1$) and (*, $G_2$) to configurable SSM addresses ($S_0$, $G_0$). In FIG. 3, packets travel from source 1 ($S_1$) 50 to a first receiver 51 and on to a multicast router A 52. These packets can then travel from multicast router A 52 to multicast router B 53 or multicast router C 54 and on to a multicast router D 58.

The multicast router C 54 queries an IGMPv2 receiver 55, joining a SSM IP network through a connection. The IGMPv2 receiver 55 is connected to a computer 57 and a television 56 and generates a membership report and sends it back to the multicast router C 54 to allow the multicast router C 54 to keep track of the group memberships.

The multicast router D 58 also queries an IGMPv2 receiver 59 and an IGMPv2 receiver 60, joining a SSM IP network through connections. The IGMPv2 receiver 59 is connected to a computer 62 and a television 61, and the IGMPv2 receiver 60 is connected to a computer 63 and a television 64. The IGMPv2 receiver 59 and the IGMPv2 receiver 60 generate membership reports and send them back to the multicast router D 58 to allow the multicast router D 58 to keep track of the group memberships.

In FIG. 3, the IGMPv2 receiver 55 is joining a group joining a group (*, $G_1$). The multicast router C 54 utilizes a multicast address translation table to translate this into a SSM group with ($S_0$, $G_0$) and stores this translation in a multicast forwarding information base in the multicast router C 54. The IGMPv2 receiver 59 is joining a group (*, $G_2$). The multicast router D 58 utilizes a multicast address translation table to translate this into a SSM group with ($S_0$, $G_0$) and stores this translation in a multicast forwarding information base in the multicast router D 58.

When multicast payload is addressed to ($S_0$, $G_0$), the multicast router D 58 consults the multicast forwarding information base in the multicast router D 58 and translates this into ($S_1$, $G_2$). Similarly when multicast payload is addressed to ($S_0$, $G_0$), the multicast router C 54 consults its multicast forwarding information base and translates this into ($S_1$, $G_1$).

It is contemplated that the method described herein can be implemented as software, including a computer-readable medium having program instructions executing on a computer, hardware, firmware, or a combination thereof. The method described herein also may be implemented in various combinations on hardware and/or software.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method for translating SM (Standard Multicast) addresses to configurable SSM (Source Specific Multicast) addresses when an IGMPv2 receiver joins a multicasting group comprising the steps of:
   (a) sending a query from a multicast router to an IGMPv2 receiver;
   (b) generating a membership report with a SM address from the IGMPv2 receiver;
   (c) transmitting the membership report with the SM address to the multicast router;
   (d) translating the membership report with the SM address, (*, $G_1$), into an SSM address, ($S_0$, $G_0$), as specified in a multicast address translation table through a management interface of the multicast router wherein the SM address is translated to the SSM address such that a group address ($G_1$) for a first group in the SM address is translated to a group address ($G_0$) for a second group different than the group address ($G_1$) for the first group and a source address ($S_0$) in the SSM address; and
   (e) storing a translation of the ($S_0$, $G_0$) address in a multicast forwarding information base in the multicast router.

2. The method of claim 1 further comprising the step of consulting the multicast forwarding information base for forwarding when a payload is addressed ($S_0$, $G_0$).

3. The method of claim 2 further comprising the step of:
   translating the SSM address ($S_0$, $G_0$) of the payload to a second SSM address ($S_1$, $G_1$) wherein the group address of the second group and the source address of the SSM address are translated to the second SSM address with a source address of a source sending the payload and the group address of the first group.

4. The method of claim 2 further comprising the step of:
   translating the address ($S_0$, $G_0$) of the payload to address ($S_0$, $G_1$).

5. A method for translating SM (Standard Multicast) addresses to configurable SSM (Source Specific Multicast) addresses when an IGMPv2 receiver joins a multicasting group comprising the steps of:
   (a) generating a membership report with a SM address from an IGMPv2 receiver;
   (b) transmitting the membership report with the SM address to a multicast router;
   (c) translating the membership report with the SM address, (*, $G_1$), into an SSM address, ($S_0$, $G_0$), as specified in a multicast address translation table through a management interface of the multicast router wherein the SM address is translated to the SSM address such that a group address ($G_1$) for a first group in the SM address is translated to a group address ($G_0$) for a second group different than the group address ($G_1$) for the first group and a source address ($S_0$) in the SSM address; and
   (d) storing a translation of the ($S_0$, $G_0$) address in a multicast forwarding information base in the multicast router.

6. The method of claim 5 further comprising
   consulting the multicast forwarding information base for forwarding when a payload is addressed ($S_0$, $G_0$).

7. The method of claim 6 further comprising
   translating the address ($S_0$, $G_0$) of the payload to address ($S_1$, $G_1$).

8. The method of claim 6 further comprising
   translating the address ($S_0$, $G_0$) of the payload to address ($S_0$, $G_1$).

9. A method for translating SM (Standard Multicast) addresses to configurable SSM (Source Specific Multicast) addresses when an IGMPv2 receiver joins a multicasting group comprising the steps of:

(a) sending a query from a multicast router to an IGMPv2 receiver;
(b) generating a membership report with a SM address from the IGMPv2 receiver;
(c) transmitting the membership report with the SM address to the multicast router;
(d) translating the membership report with the SM address, $(*, G_1)$, into an SSM address, $(S_0, G_0)$, as specified in a multicast address translation table through a management interface of the multicast router wherein the SM address is translated to the SSM address such that a group address $(G_1)$ for a first group in the SM address is translated to a group address $(G_0)$ for a second group different than the group address $(G_1)$ for the first group and a source address $(S_0)$ in the SSM address;
(e) storing a translation of the $(S_0, G_0)$ address in a multicast forwarding information base in the multicast router;
(f) consulting the multicast forwarding information base for forwarding when a payload is addressed $(S_0, G_0)$; and
(g) translating the address $(S_0, G_0)$ of the payload to address $(S_1, G_1)$.

* * * * *